United States Patent [19]
Smith, Jr. et al.

[11] Patent Number: 5,434,408
[45] Date of Patent: Jul. 18, 1995

[54] INDUCED GAMMA RAY SPECTROSCOPY WELL LOGGING SYSTEM

[75] Inventors: Harry D. Smith, Jr.; Larry L. Gadeken, both of Houston, Tex.

[73] Assignee: Halliburton Logging Services, Inc., Houston, Tex.

[21] Appl. No.: 17,898

[22] Filed: Feb. 16, 1993

Related U.S. Application Data

[62] Division of Ser. No. 890,416, May 28, 1992, abandoned.

[51] Int. Cl.[6] .............................................. G01V 5/10
[52] U.S. Cl. ................................ 250/269.8; 250/269.6
[58] Field of Search ......................... 250/269, 262, 270

[56] References Cited

U.S. PATENT DOCUMENTS

| | | | |
|---|---|---|---|
| 3,767,921 | 10/1973 | Jones | 250/261 |
| 3,780,301 | 12/1973 | Smith, Jr. et al. | 250/270 |
| 3,780,303 | 12/1973 | Smith, Jr. et al. | 250/301 |
| 3,842,264 | 10/1974 | Arnold et al. | 250/264 |
| 4,020,342 | 4/1977 | Smith, Jr. et al. | 250/270 |
| 4,071,757 | 1/1978 | Arnold et al. | 250/265 |
| 4,232,220 | 11/1980 | Hertzog | 250/270 |
| 4,424,444 | 1/1984 | Smith, Jr. et al. | 250/270 |
| 4,507,554 | 3/1985 | Hertzog et al. | 250/270 |
| 4,596,927 | 6/1986 | Hopkinson et al. | 250/270 |
| 4,760,252 | 7/1988 | Albats et al. | 250/269 |
| 4,766,543 | 8/1988 | Schmidt | 364/422 |
| 4,972,082 | 11/1990 | Loomis et al. | 250/269 |
| 5,021,653 | 6/1991 | Roscoe et al. | 250/270 |

OTHER PUBLICATIONS

"Chlorine Logging in Cased Holes", by J. T. Dewan, O. L. Stone, and R. L. Morris, Society of Petroleum Engineers, Jun. 1961, pp. 531–537.

"The Multiparameter Spectroscopy Instrument Continuous Carbon/Oxygen Log—MSI C/O", by D. M. Chace, M. G. Schmidt, and M. P. Ducheck, pp. 1-14, Presented at 10th Formation Evaluation Symposium Transactions: Canadian Well Logging Society 1985.

"Detector Design and Data Processing Effects on Elemental Yield Variance", by M. L. Gartner and L. A. Jacobson, Presented at 13th European Formation Evaluation Symposium Transactions by Society of Professional Well Logging Analysts 1990.

"The Dependence of Elemental Yield Variance on Detector Type Through Mathematical Modeling", by M. L. Gartner and L. A. Jacobson, pp. 931–935 IEEE Transactions on Nuclear Science, vol. 37, No. 2, 1990.

(List continued on next page.)

Primary Examiner—Carolyn E. Fields
Attorney, Agent, or Firm—Arnold, White & Durkee

[57] ABSTRACT

A system for use in cased well boreholes for measuring gamma ray spectra induced by bombardment of earth formations in the vicinity of the borehole with fast neutrons. Monoenergetic fast neutrons emitted in repetitive pulses penetrate the borehole structure and enter earth formations in the vicinity of the borehole and are moderated by elastic and inelastic scattering to thermal energy and captured by the nuclei of elements in and about the borehole. A scintillation detector optically coupled to a photomultiplier detects gamma radiation induced by the neutrons and produces electrical pulses with amplitudes representative of the energy of gamma rays. A pulse height analyzer connected to the output of the detector and photomultiplier separates the electrical pulses into a spectrum representative of the gamma ray energy spectrum. A timing circuit generates time gate signals to separate the electrical pulses into those of fast neutron induced gamma rays, thermal neutron capture gamma rays, and background gamma rays prior to sending the pulses to the pulse height analyzer. The timing cycle has a fast subcycle in which pulses representative substantially only of fast neutron induced gamma rays and thermal neutron capture gamma rays are sent to the pulse height analyzer and a slow subcycle portion in which pulses substantially representative only of thermal neutron capture gamma rays and background gamma rays are sent to the pulse height analyzer.

23 Claims, 3 Drawing Sheets

OTHER PUBLICATIONS

"Gamma Radiation for Inelastic Scattering of 14-Mev Neutrons by the Common Earth Elements", by Richard L. Caldwell, William R. Mills, Jr., and John B. Hickman, Jr., Feb. 15, 1960, Nuclear Science and Engineering: 8, 173-182.

"A New Nuclear Log for the Determination of Reservoir Salinity", by Stanley G. Stroud and Herman E. Schaller, Feb. 1960, Journal of Petroleum Technology, Feature Article SPE 10500, pp. 37-41.

"Carbon-Oxygen (C/O) Log: Use and Interpretation", by Lock and Hoyer, Society of Petroleum Engineers, SPE 4639, 1973.

"Laboratory and Field Evaluation of a Carbon/Oxygen Well Logging System", by Ward E. Schultz and Harry D. Smith, Jr., Society of Petroleum Engineers, SPE 4638, 1973.

"Carbon Oxygen (C/O) Logging Instrumentation", by R. B. Culver, E. C. Hopkinson, and A. H. Youmans, Society of Petroleum Engineers, SPE 4640, 1973.

"Geochemical Logging With Spectrometry Tools", by R. Hertzog, L. Colson B. Seeman, M. O'Brien, H. Scott, D. McKeon, P. Wraight, J. Grau, D. Ellis, J. Schweitzer, and M. Herron, Society of Petroleum Engineers, SPE 16792, 1987.

"A New Through-Tubing Oil-Saturation Measurement System", by B. A. Rooson, C. Stoller, R. A. Adalph, Y. Boutemy, J. C. Cheeseborough, III, J. D. Hall, D. O. McKeon, D. Pittman, B. Seeman, and S. R. Thomas, Jr., Society of Petroleum Engineers, SPE 21412; 1981.

"A New Compensated Through-Tubing Carbon/Oxygen Tool For Use in Flowing Wells", H. D. Scott, C. Stoller, B. A. Roscoe, R. E. Plasek, and R. A. Adolph, SPWLA 32nd Annual Logging Symposium, Jun. 16-19, 1991.

"Advance in Cased Hole Logging—The Multiparameter Spectroscopy Instrument Continuous Carbon/Oxygen Log (MSI C/O)", by Chace, D. M., Schmidt, M. G., Frost, E., Fertl, W. H., 3rd International Conference on Heavy Crude & Tar Sands, Jul. 22-31, 1985, Long Beach, Calif.

INDUCED GAMMA RAY SPECTROSCOPY WELL LOGGING SYSTEM

BACKGROUND OF THE INVENTION

This application is a division of U.S. application Ser. No. 07/890,416 filed May 28, 1992, now abandoned, and assigned to the Assignee of the present invention.

Proposals to use induced gamma ray spectroscopy for detecting carbon/oxygen ratio in a well borehole dates back several decades. Commercial operations in this field have dated from the mid-1970's. The primary applications today remain the cased hole determination of oil saturation in reservoirs of low or unknown water salinity. Recent efforts have expanded the use of the technique to geochemical analysis in open hole. Unfortunately, the intrinsic dynamic range of the carbon/oxygen ratio measurement is small. This requires very high statistical precision for reasonable oil saturation uncertainty. Until recently, the technique has been very slow and often required stationary measurements. This was in part because of the small intrinsic dynamic range of the carbon oxygen ratio, but, also because the detectors used in well logging instruments had significant limitations.

Over the past decade or so, several new high density scintillators have become available which can provide improved gamma ray detection capability. Newer carbon/oxygen and geochemical logging tools can use these new high density scintillators. One of these materials is bismuth germanate (BGO). The merit of the high density scintillator relative to conventional sodium iodide detectors (previously used in induced gamma ray spectrometers) is that it provides substantially better detection efficiency. That is, a larger fraction of the total gamma ray flux is in the full energy or first escape peak. Less gamma ray energy is disposed in the structureless Compton scattered low energy tail, in the more dense bismuth germanate detectors relative to sodium iodide. Additionally, in a well logging system according to concepts of the present invention, a different and unique gain stabilization system is employed which further insures more accurate energy representation of the detected gamma rays by more precisely controlling the system gain.

BRIEF DESCRIPTION OF THE INVENTION

In accordance with one aspect of the present invention, there is provided a system for use in cased well boreholes for measuring gamma ray spectra induced by the bombardment of earth formations in the vicinity of the well borehole with fast neutrons. The system comprises a neutron source, a scintillation detector of bismuth germanate (BGO) optically coupled to a photomultiplier, a pulse height analyzer, and timing circuitry.

The neutron source comprises an electronic source of monoenergetic fast neutrons which are emitted in repetitive pulses. The fast neutrons penetrate the borehole fluid, the well casing, and its cement sheath and enter the earth formations in the vicinity of the borehole. The fast neutrons are moderated by elastic and inelastic scattering to thermal energy and are captured by the nuclei of elements in and about the borehole.

The scintillation detector, which is optically coupled to the photomultiplier, detects gamma radiation induced by the neutrons emitted by the neutron source and in turn produces output electrical pulses having a magnitude representative of the energy of the gamma rays impinging upon the scintillation detector.

The pulse height analyzer, which is connected to the output of the scintillation detector, separates the output electrical pulses into a spectrum of components representative of the gamma ray energy spectrum of gamma rays impinging upon the scintillation detector. The pulse height spectra are accumulated in a downhole memory, which is part of the pulse height analyzer, and are transmitted to the surface via a digital telemetry system at regular intervals. A surface computer is programmed to analyze the spectra and to record various quantities of interest, such as the carbon/oxygen ratio, the silicon to calcium ratio, and other parameters of interest in neutron induced gamma ray spectroscopy logging.

The timing circuitry generates time gate signals to time separate the output electrical pulses of the scintillation detector into pulses representative of fast neutron induced gamma rays, thermal neutron capture gamma rays, and background gamma rays. The time gate signals are generated prior to the presentation of the output electrical pulses to the pulse height analyzer in a timing cycle comprising a fast subcycle portion and a slow subcycle portion. During the fast subcycle portion, output pulses representative of substantially only fast neutron induced gamma rays and thermal neutron capture gamma rays are presented to the pulse height analyzer. During the slow subcycle portion, output pulses representative of substantially only thermal neutron capture gamma rays and background gamma rays are presented to the pulse height analyzer.

The fast subcycle portion of the timing cycle includes at least one capture gamma ray time gate passing output pulses to the pulse height analyzer essentially only during quiescent intervals between repetitive pulses of fast neutrons from the electronic neutron source.

The slow subcycle includes plural capture gamma ray time gates and a background gamma ray time gate. The plural capture gamma ray time gates and the background gamma ray time gate pass the output pulses to the pulse height analyzer only during time intervals when the electronic neutron source is not producing fast neutrons.

The above referred to and other cited features of the present invention are better understood by reference to the detailed description to follow when taken in conjunction with the accompanying drawings in which:

DETAILED DESCRIPTION OF THE INVENTION

Figure 1:
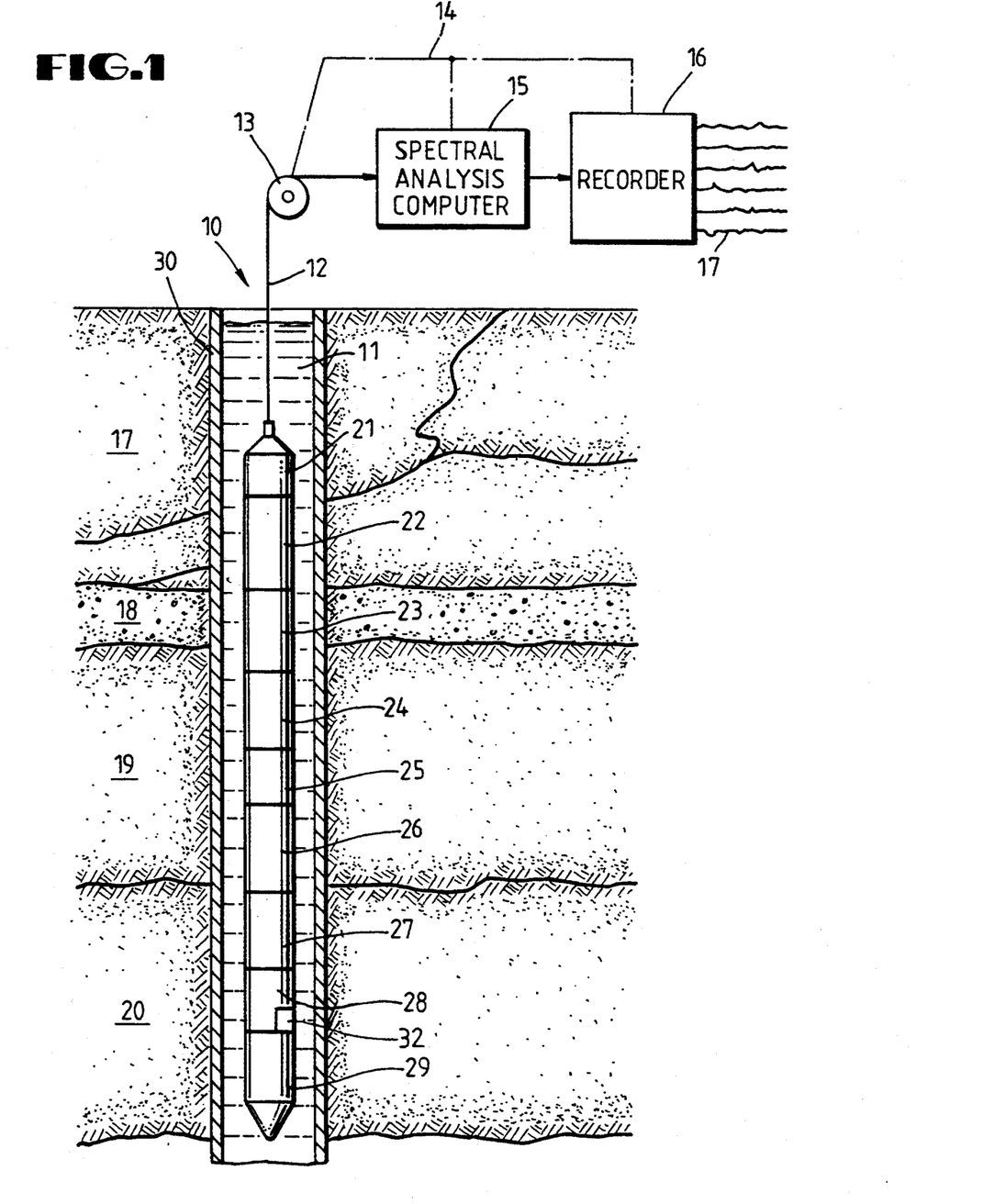
FIG. 1 is a schematic diagram illustrating a well logging system in accordance with concepts of the present invention disposed in a well borehole.

Referring initially to FIG. 1, a well logging system in accordance with concepts of the present invention is illustrated in a schematic manner in a cased well borehole. A well borehole 10 lined with a steel casing 30 and filled with a borehole fluid 11 penetrates earth formations 17, 18, 19 and 20. A well logging cable 12, which is of the usual armored multiconductor cable type, supports in the borehole 10, a well logging sonde 21 for making neutron induced gamma ray spectral measurements in accordance with the concepts of the present invention. The well logging cable 12 passes over a sheave wheel 13 which maybe electrically or mechanically coupled, as indicated by a dotted line 14, to a spectral analysis computer 15 and a data recorder 16. The spectral analysis computer 15 may comprise, for example, any suitably programmed general purpose computer capable of receiving signals from the downhole equipment. The recorder 16 may comprise a strip chart recorder, as indicated having a record medium 17, or may comprise a digital tape or a disk file memory as desired.

Figure 2A:
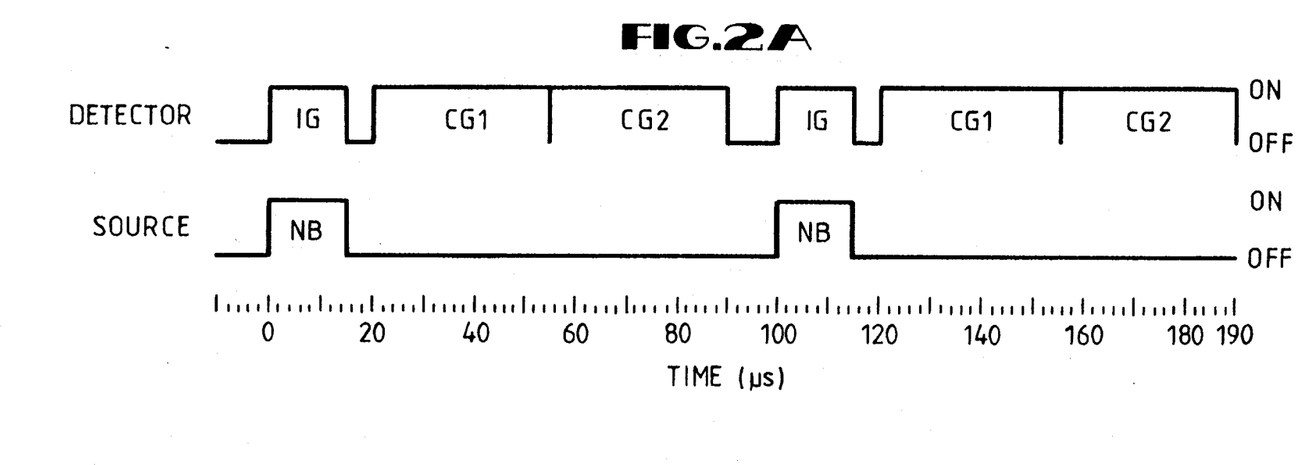
FIG. 2A is a timing diagram showing the timing of a short spaced burst subsequence for both the neutron source and detector when used in accordance with concepts of the present invention.
Figure 2B:
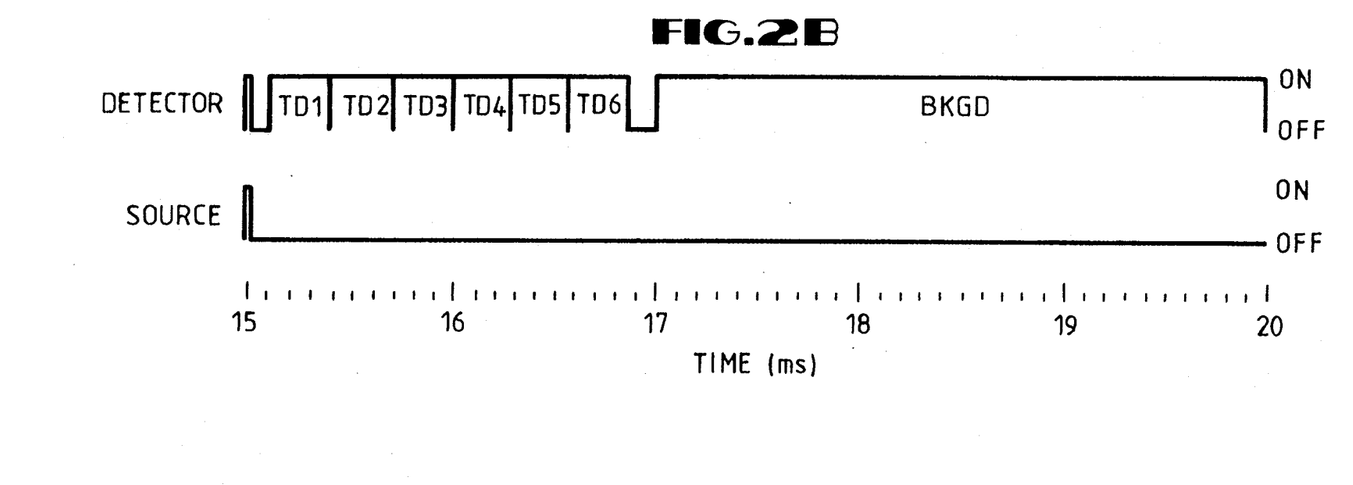
FIG. 2B is a timing diagram showing the timing subsequence for a slow or long spaced neutron burst subsequence for both the neutron source and the detector when used in accordance with concepts of the present invention.

The downhole sonde 21 comprises a power supply portion 22, a timing circuit portion 23, a telemetry portion 24, a gain stabilizer portion 25, a pulse height analyzer portion 26, a detector portion 27, a source portion 28, and a high voltage power supply portion 29. In operation, the power supply portion 22 takes electrical power from one or more of the conductors of logging cable 12 and converts it to appropriate voltage and current levels for supplying internal circuits of the downhole sonde 21 with electrical power as required. The timing circuits, as will be discussed in more detail subsequently in conjunction, with FIGS. 2A and 2B, provide timing pulses for opening and closing various data gates and thereby operating various detection schemes according to the concepts of the invention. The telemetry circuitry 24 is a conventional digital telemetry system capable of communicating to and from the surface supplied equipment at a rate of 50 kilobits/sec.

The gain stabilizer circuit 25, which will be described in more detail subsequently, operates in conjunction with the pulse height analyzer 26. The analyzer 26 receives signals from the detector portion of the tool 27. The detector signals are representative of gamma rays impinging upon the detector and which have been induced by a neutron bombardment from a neutron source 28 which is supplied for its operation by approximately 100 kilovolt high voltage power supply 29 or from a background gamma ray source. The neutron source 28 includes a neutron source controller 32 of conventional design which receives timing pulses from the timing circuit portion 23 to thereby control the emission of neutron pulses.

Referring now to FIGS. 2A and 2B, these Figures illustrate the timing applied to both the neutron source 28 and the detector circuits 26 and 27. FIG. 2A illustrates a fast timing subcycle, while FIG. 2B illustrates a slower timing subcycle. Referring initially to FIG. 2b, a timing cycle of 5 milliseconds in duration and repeated 50 times/sec. is illustrated. The neutron source 28 is turned on for a very short 14 MeV neutron pulse having a time duration of approximately 15 microseconds at the beginning of this 5 millisecond duration sub-cycle.

During the 1985 microseconds after the neutron source is turned off, a plurality of capture gamma ray time gates are opened to measure the thermal neutron population die-away, also commonly known as thermal decay, as a function of time. Up to six, eight or even more gates may be used as desired according to known techniques such as that of U.S. Pat. No. 4,424,444 (these gates are indicated as TD1-TD6 in the timing diagram). Using this technique the borehole and formation thermal neutron capture crosssections are measured. Thus the die-away of thermal neutrons produced by the moderation of the fast neutrons emitted by the neutron source 28 are detected for the first two milliseconds of this 5 millisecond subcycle. For the remaining 3 milliseconds of the subcycle portion of FIG. 2b, then, the detector 27 is used to detect background gamma radiation due to naturally occurring gamma rays in the earth formations surrounding the well bore. A background gate (indicated as BKGD in the timing diagram) provides the measurement of the background gamma radiation. All measurements may thus be corrected for background based on this background measurement by subtraction of the appropriately scaled count rate.

During the fast pulse portion of the timing diagram illustrated in FIG. 2a, it may be observed that the neutron source 28 is pulsed on for fifteen microsecond duration pulses (indicated as NB in the timing diagram). In FIG. 2a, while the neutron bursts starting at time T=zero and T=100 microseconds are taking place an inelastic scattering gamma ray time gate (indicated as IG in the timing diagram) is opened allowing pulses from the detector 27 occurring during the neutron burst to be gated to the pulse height analyzer circuitry 26. At the close of the neutron burst, the detector 27 is gated off for approximately 5 microseconds. This allows thermalization of the fast neutrons. Then a first capture gamma ray time gate (indicating as CG1 in the timing diagram) having a duration of thirty-five 4 microseconds (from 20 to 55 microseconds) is opened. A second capture gamma ray time gate (indicated as CG2 in the timing diagram) having a duration of thirty-five microseconds (from 55 to 90 microseconds.) is opened thereafter. The entire short or fast pulse cycle is then repeated beginning at the time labelled 100 microseconds of FIG. 2a and the neutron source 28 and detector timing are repeated as previously described for the next 100 microseconds. The entire sequence which is illustrated in FIG. 2a is repeated for a period of 1500 microseconds. The short or fast pulse subintervals of 100 microseconds duration are time interlocked with the longer 5 millisecond intervals illustrated in FIG. 2B. Timing pulses suitable for this purpose are produced in Timing Circuit section 23 of FIG. 1. In order to correct all measurements for background radiation the background pulses output to the pulse height analyzer are appropriately analyzed and scaled for different gate widths and then subtracted from the spectral data gathered during the fast subcycle time gates and the total count rates gathered in the slow subcycle time gates prior to the further processing of the spectral data and count rates.

Figure 3:
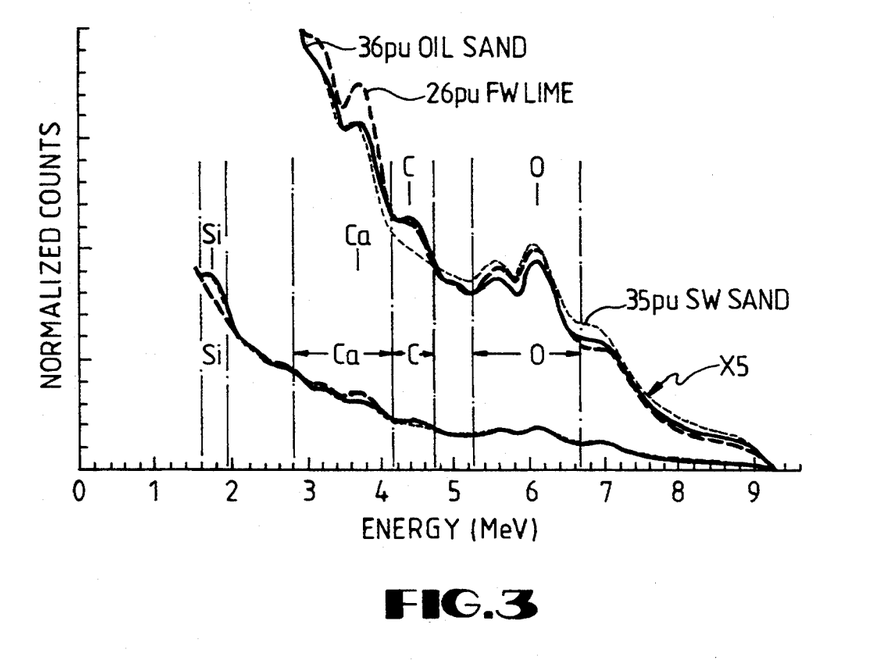
FIG. 3 is a diagram illustrating an inelastic gamma ray spectrum taken with an instrument according to the concepts of the present invention.

Referring now to FIG. 3, an inelastic gamma ray energy spectrum which comprises gamma ray pulses detected during the gates labelled IG (inelastic gamma rays) in FIG. 2a and supplied to the pulse height analyzer 26 during this time when the neutron bursts are on is shown schematically for three different formations (for ease of illustration the spectra are shown both at a normal scale and at 5X scale to enable a clear illustration of all of the peaks). It will be observed that in the inelastic gamma ray spectrum that inelastic scattering peaks attributable to carbon, oxygen, silicon and calcium appear in the inelastic gamma ray spectrum. The inelastic spectrum of course is caused by a fast neutron scattering from the nucleus of an element in the vicinity of the borehole and exciting these nuclei to higher energy levels thereby losing some of the energy of the scattered neutrons (ie. scattering with energy loss). The excited nuclei returning to the ground state emit gamma rays characteristic of each of the nuclear species. Energy windows labelled C, O, Ca, Si are shown in the spectrum of FIG. 3 for the carbon, oxygen, silicon and calcium inelastic scattering energy peaks.

Figure 4:
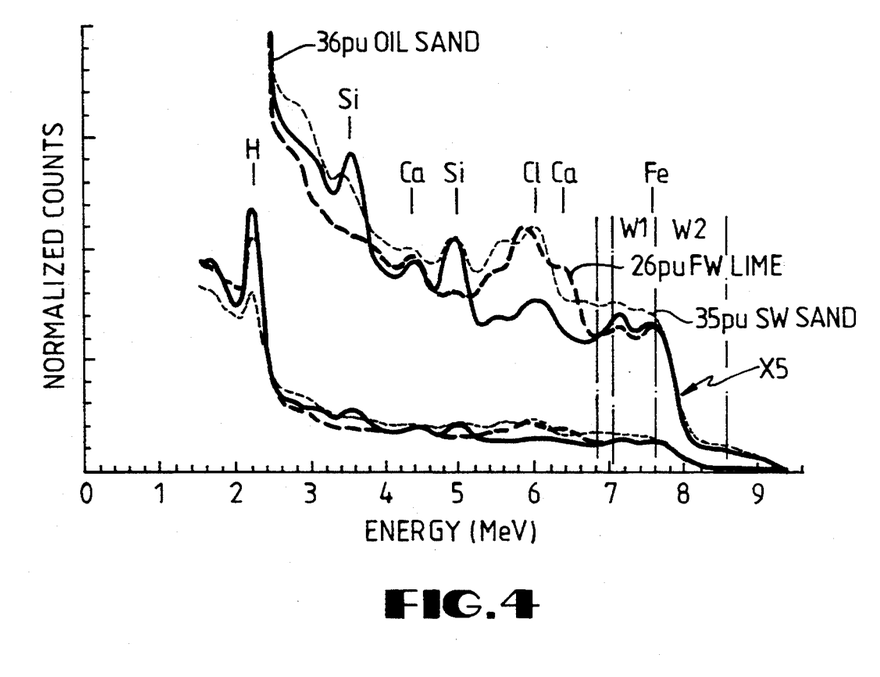
FIG. 4 is a schematic diagram illustrating a capture gamma ray spectrum taken according to the concepts of the present invention and showing gain stabilization of energy windows.

Referring now to FIG. 4, a capture gamma ray spectrum is shown schematically for three different formations (for ease of illustration the spectra are shown both at a normal scale and at 5X scale to enable a clear illustration of all of the peaks). The capture gamma ray spectrum is taken in gates labelled CG1 and CG2 in FIG. 2a. This spectrum is attributable to the emission of gamma rays by the decay to the ground state of nuclei which have been excited by the capture of thermalized neutrons. As it takes perhaps several microseconds for all of the neutrons to become thermalized following the emission of a fast neutron burst from the source 28 of the instrument 21 shown in FIG. 1, the waiting period of 5 microseconds between the end of the neutron burst to the beginning of the capture gamma ray gates illustrated in FIG. 2a allows for thermalization of the fast 14 MeV neutrons emitted by the source 28 to achieve a thermal neutron population.

Referring again to FIG. 4, it will be seen that the iron peak (labelled Fe in FIG. 4) occurs at an energy of 7.65 MeV. Energy windows labelled W1 and W2 are positioned to straddle the Fe peak and are used for system gain control purposes. The iron peak will of course always be present in a cased well borehole in which the pulsed spectral gamma ray tool according to the concepts of the present invention is deployed.

The iron edge is always a prominent feature in cased well borehole spectrum, because the casing and the tool housing both contain iron. The iron peak is located at 7.65 MeV and is discernable, but not very prominent, in the capture gamma ray spectrum of FIG. 4. This peak becomes less prominent if chlorine infested or salt water is present in the earth formations surrounding the borehole. However, all of the capture gamma ray spectra show a precipitous drop at energies just above the iron 7.65 MeV line. Thus, two equal width adjacent windows labelled W1 and W2 spanning this edge are indicated in FIG. 4. Equality of width of these energy windows is not a critical requirement but is only made for convenience.

A spectral procedure for gain stabilization is based upon the count rates in the energy windows labelled W1 and W2. This procedure which is implemented in a microprocessor program in gain stabilizer 25 adjusts the photomultiplier high voltage (contained in detector 27) to maintain the ratio of counts in the energy window labelled W1 to that in energy window labelled W2 equal to the integer two. Again, this value of 2.0 is not particularly necessary as any value in the range from two to three would probably work just as well. It is merely convenient to use. Thus, the gain of the photomultiplier portion of detector 27 is increased whenever the ratio becomes greater than 2.0 and the gain of the photomultiplier is decreased whenever the ratio becomes less than 2.0. This places the juncture of the two windows near the upper count rate portion of the iron (Fe) edge. Because there are two gain settings where the window ratio will be 2, a start up procedure is required to assume selection of the correct gain value. This is accomplished by raising the photomultiplier gain until the count rate in the upper window W2 exceeds a predetermined minimum value prior to beginning the gain stabilization process as previously described.

Laboratory and field experience have demonstrated the utility and reliability of this technique of gain stabilization. Important and innovative features of this gain stabilization are that no isotopic source is required which would contribute a background to the primary measurement. Also, the stabilization is made on a feature of a capture gamma ray spectrum which is always present and which is unperturbed by formation matrix composition or borehole or formation fluid composition. Finally, stabilization of the pulse height analyzer spectral gain on a high energy feature of the spectrum renders the spectrum much less sensitive to zero offset.

It should also be noted that while the preferred embodiment previously described varies the high voltage on the photomultiplier tube itself inorder to effect gain stabilization, that this stabilization technique could equally well be applied to a variable gain amplifier which would come subsequent to the photomultiplier tube in the electronic circuitry comprising the detector 27 portion of the sonde 21 of FIG. 1.

The foregoing descriptions may make other alternative embodiments of the invention apparent to those having skill in the art. It is the aim of the appended claims to cover all such changes and modifications as fall within the true spirit and scope of the invention.

We claim:

1. A system for use in cased well boreholes for measuring gamma ray spectra induced by the bombardment of earth formations in the vicinity of the well borehole with fast neutrons, comprising:
   (a) an electronic source of monoenergetic fast neutrons which are emitted in repetitive pulses and which penetrate the borehole fluid, the well casing, and its cement sheath and which enter the earth formations in the vicinity of the borehole and which are moderated by elastic and inelastic scattering to thermal energy and captured by the nuclei of elements in and about the borehole;
   (b) a scintillation detector optically coupled to a photomultiplier for detecting gamma radiation induced by said neutrons and which produces output electrical pulses having an amplitude representative of the energy of a gamma ray impinging upon said scintillation detector;
   (c) a pulse height analyzer connected to the output of said scintillation detector and said photomultiplier for separating said output electrical pulses into a spectrum of components representative of the gamma ray energy spectrum of gamma rays impinging upon said scintillation detector; and
   (d) timing means for generating time gate signals to time separate output electrical pulses into those representative of fast neutron induced gamma rays, thermal neutron capture gamma rays, and background gamma rays prior to the presentation of said output electrical pulses to said pulse height analyzer in a timing cycle comprising a fast subcycle portion during which said output pulses representative of substantially only fast neutron induced gamma rays and thermal neutron capture gamma rays are presented to said pulse height analyzer and a slow subcycle portion during which said output pulses representative of substantially only thermal neutron capture gamma rays and background gamma rays are presented to said pulse height analyzer;

wherein said fast subcycle portion of said timing cycle includes:

at least one capture gamma ray time gate passing said output pulses to said pulse height analyzer essentially only during quiescent intervals between said repetitive pulses of fast neutrons from said electronic neutron source.

2. The system of claim 1 and further including control means responsive to said timing means for controlling the emission of said repetitive neutron pulses by said electronic source of monoenergetic fast neutrons.

3. The system of claim 2 wherein said fast subcycle portion of said timing cycle includes inelastic scattering gamma ray time gates passing said output pulses to said pulse height analyzer essentially only during said repetitive pulses of fast neutrons from said electronic neutron source.

4. The system of claim 3 wherein said slow subcycle portion of said timing cycle includes plural capture gamma ray time gates and a background gamma ray time gate, wherein said plural capture gamma ray time gates and said background gamma ray time gate pass said output pulses to said pulse height analyzer only during time intervals when said electronic neutron source is not producing fast neutrons.

5. The system of claim 4 wherein said plural capture gamma ray time gates include at least four relatively closely spaced capture gamma ray time gates wherein the total thermal neutron capture gamma ray count rate changes as a function of time and may be detected and used to separate a borehole component and a formation component of thermal neutron capture cross section of the earth formations in the vicinity of the well borehole.

6. The system of claim 5 wherein said slow subcycle portion of said timing cycle includes a background gamma ray time gate passing said output pulses to said pulse height analyzer during time intervals sufficiently subsequent to a neutron pulse from said electronic fast neutron source to allow substantially all thermal neutron capture gamma rays to die away so that substantially only long half lived background gamma radiation is detected during said background gamma ray time gate.

7. The system of claim 6 wherein said background pulses output to said pulse height analyzer are appropriately analyzed and scaled for different gate widths and are subtracted from the spectral data in said fast subcycle capture gamma ray time gates prior to those spectra being further processed.

8. The system of claim 6 wherein said background pulses are scaled for different gate widths and are subtracted from said total count rates in said slow subcycle capture gamma ray time gates prior to those total count rates being further processed.

9. The system of claim 6 wherein said fast subcycle of said timing cycle is repeated about 150 times for each slow subcycle of said timing cycle.

10. The system of claim 9 wherein said slow subcycle of said timing cycle is repeated approximately fifty times per second.

11. The system of claim 1 wherein said slow subcycle portion of said timing cycle includes a background gamma ray time gate passing said output pulses to said pulse height analyzer during time intervals sufficiently subsequent to a neutron pulse from said electronic fast neutron source to allow substantially all thermal neutron capture gamma rays to die away so that substantially only long half lived background gamma radiation is detected during said background gamma ray time gate.

12. The system of claim 11 wherein said background pulses from said slow subcycle output to said pulse height analyzer are appropriately scaled and subtracted from the spectral data in said fast subcycle time gates prior to those spectra being further processed.

13. The system of claim 1 wherein said fast subcycle of said timing cycle is repeated about 150 times for each slow subcycle of said timing cycle.

14. The system of claim 1 wherein said slow subcycle of said timing cycle is repeated approximately fifty times per second.

15. A system for use in cased well boreholes for measuring gamma ray spectra induced by the bombardment of earth formations in the vicinity of the well borehole with fast neutrons, comprising:

(a) an electronic source of monoenergetic fast neutrons which are emitted in repetitive pulses and which enter the earth formations in the vicinity of the borehole and are moderated by elastic and inelastic scattering to thermal energy and captured by the nuclei of elements in and about the borehole;

(b) a scintillation detector optically coupled to a photomultiplier for detecting gamma radiation induced by said neutrons and which produces output electrical pulses having an amplitude representative of the energy of a gamma ray impinging upon said scintillation detector;

(c) a pulse height analyzer connected to the output of said scintillation detector and said photomultiplier for separating said output electrical pulses into a spectrum of components representative of the gamma ray energy spectrum of gamma rays impinging upon said scintillation detector;

(d) timing circuitry for generating time gate signals to time separate output electrical pulses into those representative of fast neutron induced gamma rays, thermal neutron capture gamma rays, and background gamma rays prior to the presentation of said output electrical pulses to said pulse height analyzer in a timing cycle comprising a fast subcycle portion during which said output pulses representative substantially only of fast neutron induced gamma rays and thermal neutron capture gamma rays are presented to said pulse height analyzer, and a slow subcycle portion during which said output pulses substantially only representative of thermal neutron capture gamma rays and background gamma rays are presented to said pulse height analyzer; and wherein said fast subcycle portion of said timing cycle includes:

inelastic scattering gamma ray time gates passing said output pulses to said pulse height analyzer essentially only during said repetitive pulses of fast neutrons from said electronic neutron source, and at least one capture gamma ray time gate passing said output pulses to said pulse height analyzer essentially only during quiescent intervals between said repetitive pulses of fast neutrons from said electronic neutron source; and wherein said slow subcycle portion of said timing cycle includes:

plural capture gamma ray time gates passing said output pulses to said pulse height analyzer only during time intervals when said electronic neutron source is not producing fast neutrons, wherein said plural capture gamma ray time gates include at least four relatively closely spaced capture gamma ray time gates wherein the total thermal capture gamma ray count rate changes as a function of time and may be detected and used to separate a borehole component and formation component of thermal capture cross section of the earth formations in the vicinity of the well borehole, and a background gamma ray time gate passing said output pulses to said pulse height analyzer during time intervals sufficiently subsequent to a neutron pulse from said electronic fast neutron source to allow substantially all thermal neutron capture gamma rays to die away so that substantially only long half-lived background gamma radiation is detected during said background gamma ray time gates;

wherein said background pulses output to said pulse height analyzer are appropriately analyzed and scaled for different gate widths and are subtracted from both the spectral data in said fast subcycle capture gamma ray time gates and the total count rates in said slow subcycle capture gamma ray time gates prior to the further processing of the spectral data and the total count rates;

wherein said fast subcycle is repeated about 150 times for each slow subcycle of said timing cycle; and wherein said slow subcycle is repeated approximately fifty times per second;

(e) a controller responsive to said timing circuitry for controlling the emission of said repetitive neutron pulses by said electronic source of monoenergetic fast neutrons.

16. A system for use in cased well boreholes for measuring gamma ray spectra induced by the bombardment of earth formations in the vicinity of the well borehole with fast neutrons, comprising:

(a) an electronic source of monoenergetic fast neutrons which are emitted in repetitive pulses and enter the earth formations in the vicinity of the borehole and are moderated by elastic and inelastic scattering to thermal energy and captured by the nuclei of elements in and about the borehole;

(b) a scintillation detector optically coupled to a photomultiplier for detecting gamma radiation induced by said neutrons and which produces output electrical pulses having an amplitude representative of the energy of a gamma ray impinging upon said scintillation detector;

(c) a pulse height analyzer connected to the output of said scintillation detector and said photomultiplier for separating said output electrical pulses into a spectrum of components representative of the gamma ray energy spectrum of gamma rays impinging upon said scintillation detector; and (d) a timer configured to generate time gate signals to time separate said output electrical pulses into those representative of fast neutron induced gamma rays, thermal neutron capture gamma rays, and background gamma rays prior to the presentation of said electrical pulses to said pulse height analyzer in a timing cycle comprising a fast subcycle portion during which said output pulses representative substantially only of fast neutron induced gamma rays and thermal neutron capture gamma rays are presented to said pulse height analyzer and a slow subcycle portion during which said output pulses substantially only representative of thermal neutron capture gamma rays and background gamma rays are presented to said pulse height analyzer; wherein, said slow subcycle portion of said timing cycle includes:

plural capture gamma ray time gates and a background gamma ray time gate, wherein said plural capture gamma ray time gates and said background gamma ray time gate pass said output pulses to said pulse height analyzer only during time intervals when said electronic neutron source is not producing fast neutrons; and wherein said plural capture gamma ray time gates include at least four relatively closely spaced capture gamma ray time gates wherein the total thermal capture gamma ray count rate changes as a function of time and may be detected and used to separate a borehole component and formation component of thermal capture cross section of the earth formations in the vicinity of the well borehole.

17. A system for use in cased well boreholes for measuring gamma ray spectra induced by the bombardment of earth formations in the vicinity of the well borehole with fast neutrons, comprising:

(a) an electronic source of monoenergetic fast neutrons which are emitted in repetitive pulses and enter the earth formations in the vicinity of the borehole and are moderated by elastic and inelastic scattering to thermal energy and captured by the nuclei of elements in and about the borehole;

(b) a scintillation detector optically coupled to a photomultiplier for detecting gamma radiation induced by said neutrons and which produces output electrical pulses having an amplitude representative of the energy of a gamma ray impinging upon said scintillation detector;

(c) a pulse height analyzer connected to the output of said scintillation detector and said photomultiplier for separating said output electrical pulses into a spectrum of components representative of the gamma ray energy spectrum of gamma rays impinging upon said scintillation detector; and (d) timing means for generating time gate signals to time separate said output electrical pulses into those representative of fast neutron induced gamma rays, thermal neutron capture gamma rays, and background gamma rays prior to the presentation of said electrical pulses to said pulse height analyzer in a timing cycle comprising a fast subcycle portion during which said output pulses representative substantially only of fast neutron induced gamma rays and thermal neutron capture gamma rays are presented to said pulse height analyzer, and a slow subcycle portion during which said output pulses substantially only representative of thermal neutron capture gamma rays and background gamma rays are presented to said pulse height analyzer; wherein said slow subcycle portion of said timing cycle includes a background gamma ray time gate passing said output pulses to said pulse height analyzer during time intervals sufficiently subsequent to a neutron pulse from said electronic fast neutron source so that substantially only long half lived background gamma radiation is detected during said background gamma ray time gate, and wherein said background pulses from said slow subcycle output to said pulse height analyzer are appropriately scaled and subtracted from the spectral data in said fast subcycle time gates prior to those spectra being further processed.

18. A system for use in cased well boreholes for measuring gamma ray spectra induced by the bombardment of earth formations in the vicinity of the well borehole with fast neutrons, comprising:

(a) an electronic source of monoenergetic fast neutrons which are emitted in repetitive pulses and which enter the earth formations in the vicinity of the borehole and which are moderated by elastic and inelastic scattering to thermal energy and captured by the nuclei of elements in and about the borehole;

(b) a scintillation detector optically coupled to a photomultiplier for detecting gamma radiation induced by said neutrons and which produces output electrical pulses having an amplitude representative of the energy of a gamma ray impinging upon said scintillation detector;

(c) a pulse height analyzer connected to the output of said scintillation detector and said photomultiplier for separating said output electrical pulses into a spectrum of components representative of the gamma ray energy spectrum of gamma rays impinging upon said scintillation detector;

(d) timing means for generating time gate signals to time separate output electrical pulses into those representative of fast neutron induced gamma rays, thermal neutron capture gamma rays, and background gamma rays prior to the presentation of said output electrical pulses to said pulse height analyzer in a timing cycle comprising a fast subcycle portion during which said output pulses representative of substantially only fast neutron induced gamma rays and thermal neutron capture gamma rays are presented to said pulse height analyzer, and a slow subcycle portion during which said output pulses representative of substantially only thermal neutron capture gamma rays and background gamma rays are presented to said pulse height analyzer; and wherein said slow subcycle portion of said timing cycle includes:

plural capture gamma ray time gates and a background gamma ray time gate, wherein said plural capture gamma ray time gates and said background gamma ray time gate pass said output pulses to said pulse height analyzer only during time intervals when said electronic neutron source is not producing fast neutrons.

19. The system of claim 18 wherein said plural capture gamma ray time gates include at least four relatively closely spaced capture gamma ray time gates wherein the total thermal neutron capture gamma ray count rate changes as a function of time and may be detected and used to separate a borehole component and a formation component of thermal neutron capture cross section of the earth formations in the vicinity of the well borehole.

20. The system of claim 18 wherein said plural capture and background time gates include at least two capture gamma ray time gates wherein the total thermal neutron capture count rate changes as a function of time and may be detected and used to measure the formation component of the thermal neutron capture cross section of earth formations in the vicinity of the borehole.

21. The system of claim 18 wherein said background pulses output to said pulse height analyzer are appropriately analyzed and scaled for different gate widths and are subtracted from the spectral data in said fast subcycle capture gamma ray time gates prior to those spectra being further processed.

22. The system of claim 18 wherein said background pulses are scaled for different gate widths and are subtracted from said total count rates in said slow subcycle capture gamma ray time gates prior to those total count rates being further processed.

23. A system for use in cased well boreholes for measuring gamma ray spectra induced by the bombardment of earth formations in the vicinity of the well borehole with fast neutrons, comprising:

(a) a neutron source for emitting fast neutrons which penetrate the borehole fluid, the well casing and its cement sheath and enter the earth formations in the vicinity of the borehole, said fast neutrons being moderated by elastic and inelastic scattering to thermal energy and captured by the nuclei of elements in and about the borehole;

(b) a scintillation detector for detecting gamma radiation induced by said fast neutrons, said scintillation detector producing output electrical pulses having a magnitude representative of the detected gamma radiation;

(c) a timing generator for generating time gate signals to time separate the output electrical pulses into pulses representative of fast neutron induced gamma rays, thermal neutron capture gamma rays, and background gamma rays; and (d) a pulse height analyzer receiving the time-gated output electrical pulses from said scintillation detector, said time-gated pulse height analyzer separating said output electrical pulses into a spectrum of components representative of a gamma ray energy spectrum of the detected gamma radiation, said timing generator having a timing cycle comprising a fast subcycle portion during which said output electrical pulses representative of substantially only fast neutron induced gamma rays and thermal neutron capture gamma rays are presented to said pulse height analyzer and a slow subcycle portion during which said output electrical pulses representative of substantially only thermal neutron capture gamma rays and background gamma rays are presented to said pulse height analyzer;

wherein said fast subcycle portion of said timing cycle includes at least one capture gamma ray time gate and said slow subcycle portion of said timing cycle includes a plurality of capture gamma ray time gates.

* * * * *

UNITED STATES PATENT AND TRADEMARK OFFICE
CERTIFICATE OF CORRECTION

PATENT NO. : 5,434,408
DATED : July 18, 1995
INVENTOR(S) : Smith, Jr. et al

It is certified that error appears in the above-indentified patent and that said Letters Patent is hereby corrected as shown below:

Column 4, line 40, after "thirty-five" delete "4".

Column 4, line 44, after "microseconds" delete ".".

Signed and Sealed this

Twenty-fourth Day of October, 1995

Attest:

BRUCE LEHMAN

*Attesting Officer*　　　*Commissioner of Patents and Trademarks*